United States Patent
Yada (10) Patent No.: US 8,823,602 B2
(45) Date of Patent: Sep. 2, 2014

(54) DISPLAY SCREEN SHARING SYSTEM, DISPLAY SCREEN SHARING METHOD, AND PROGRAM

(71) Applicant: NEC Corporation, Tokyo (JP)

(72) Inventor: Toru Yada, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 13/626,259

(22) Filed: Sep. 25, 2012

(65) Prior Publication Data

US 2013/0076764 A1 Mar. 28, 2013

(30) Foreign Application Priority Data

Sep. 26, 2011 (JP) ................................ 2011-209467

(51) Int. Cl.
  *G09G 5/00* (2006.01)
  *G06F 13/14* (2006.01)
  *G06F 3/00* (2006.01)

(52) U.S. Cl.
  USPC ............................. 345/1.2; 345/520; 715/719

(58) Field of Classification Search
  USPC .......................................................... 345/1.2
  See application file for complete search history.

(56) References Cited

U.S. PATENT DOCUMENTS

| 6,057,835 A * | 5/2000 | Sato et al. ...................... 715/759 |
| 2009/0235170 A1* | 9/2009 | Golden et al. ................. 715/719 |

FOREIGN PATENT DOCUMENTS

| JP | H08185302 A | 7/1996 |
| JP | 2000259535 A | 9/2000 |

* cited by examiner

*Primary Examiner* — Charles V Hicks
(74) *Attorney, Agent, or Firm* — Sughrue Mion, PLLC (57) ABSTRACT

Display screen sharing system that shares common screen among a plurality of terminals comprises transmission side terminal that has operation right for common screen; and reception side terminal that does not have operation right for common screen. Reception side terminal comprises display area detection unit that acquires display area information indicating area of common screen displayed at reception side terminal itself, and supplies display area information to transmission side terminal. Transmission side terminal comprises common display area frame control unit that determines common display area based on display area information supplied from reception side terminal, and displays common display area on screen at transmission side terminal itself.

9 Claims, 10 Drawing Sheets

DISPLAY SCREEN SHARING SYSTEM, DISPLAY SCREEN SHARING METHOD, AND PROGRAM

TECHNICAL FIELD

Reference to Related Application

This application is based upon and claims the benefit of the priority of Japanese patent application No. 2011-209467, filed on Sep. 26, 2011, the disclosure of which is incorporated herein in its entirety by reference thereto.

The present invention relates to a display screen sharing system, a display screen sharing method, and program.

BACKGROUND

A screen sharing function is known in which it is possible to share a screen on a shared window of one terminal between a transmission side (one terminal) and a reception side(s) (the other terminal(s)) among a plurality of terminals that are remotely positioned by transmitting the screen to the other terminal(s), and displaying the same screen on a shared window(s) of the other terminal(s). This function has been already implemented in many web meeting systems etc.

When the screen sharing function is used in a web meeting system, since terminals have a different sized display, or each user participates in the meeting while executing various applications on each of the screens, there are different sized shared windows among the terminals in many cases. For this reason, there is a mismatch between a shared screen displayed on a transmission side terminal and that on a reception side terminal(s), so that there are cases where the meeting cannot proceed smoothly.

For example, a window sharing system described in Patent Literature 1 controls so that visible areas of shared windows match from each other by changing size(s) of a shared window(s) of the other terminal(s) so as to match size of a shared window of one terminal having an operation right.

A window display controller described in Patent Literature 2, arrangement, size, and title etc. of a shared window on a terminal having an operation right are displayed in a simplified manner on a reception side terminal(s).
[Patent Literature 1]
JP Patent Kokai Publication No. JP-H08-185302A
[Patent Literature 2]
JP Patent Kokai Publication No. JP2000-259535A

SUMMARY

The disclosures of above cited Patent Literatures are incorporated herein in their entirety by reference thereto. However, according to a method described in Patent Literature 1, even though a reception side terminal displays initially with a large window size, in a case where a window size of a transmission side terminal is small, a window size of the reception side terminal is set to be too small. Thus, there is a problem such that it is difficult to view the screen at the reception side terminal in this method on the contrary. According to a method described in Patent Literature 2, there is a problem such that a user of a transmission side terminal which has an operation right cannot know a display state of a shared window of a reception side terminal.

Therefore, there is a need in the art to provide a screen sharing function, in a case where size of a shared window on a transmission side terminal is different from that on each of the reception side terminals, is realized so that the transmission side terminal can know the display states of the reception side terminals without the problem such that it is difficult to view the screen.

A display screen sharing system in accordance with a first aspect of the present disclosure shares a common screen among a plurality of terminals. The display screen sharing system comprises: a transmission side terminal that has an operation right for the common screen; and a reception side terminal that does not have the operation right for the common screen. The reception side terminal comprises a display area detection unit that acquires display area information indicating an area of the common screen displayed at the reception side terminal itself, and supplies the display area information to the transmission side terminal. The transmission side terminal comprises a common display area frame control unit that determines a common display area based on the display area information supplied from the reception side terminal, and displays the common display area on a screen at the transmission side terminal itself.

According to a second aspect, there is provided a display screen sharing method, that shares a common screen among a plurality of terminals, the method comprising: by a reception side terminal that does not have an operation right for the common screen, acquiring display area information that indicates an area of the common screen displayed at the reception side terminal itself; by the reception side terminal, supplying the display area information to a transmission side terminal that has an operation right for the common screen; by the transmission side terminal, determining a common display area based on the display area information supplied from the reception side terminal; and by the transmission side terminal, displaying the common display area on a screen of the transmission side terminal itself.

According to a third aspect, there is provided a non-transitory computer-readable recording medium that stores a program. The program is adapted for operating a computer as a transmission side terminal that has an operation right for the common screen in a display screen sharing system sharing a common screen among a plurality of terminals, wherein the program operates the computer as a common display area frame control unit that determines a common display area based on display area information which is supplied from a reception side terminal that does not have an operation right for the common screen; and that indicates an area of the common screen displayed at the reception side terminal, and displays the common display area on a screen of the transmission terminal itself.

According to the present disclosure, it provides a contribution to the need, i.e., in a case where size of a shared window on a transmission side terminal is different from that on each of the reception side terminals, the transmission side terminal can know the display states of the reception side terminals without the problem such that it is difficult to view the screen.

PREFERRED MODES

In the present disclosure there are preferred possible modes as set forth below.
(Mode 1)
A display screen sharing system, according to the first aspect.
(Mode 2)
In the display screen sharing system, it is preferred that the system comprises a plurality of the reception side terminals, wherein the common display area frame control unit of the transmission side terminal acquires the display area information from each of the reception side terminals, and displays an area that is displayed in common at all the reception side terminals as the common display area.
(Mode 3)
In the display screen sharing system, it is preferred that the transmission side terminal comprises a maximum display area frame control unit that calculates a maximum size of a display area that can be displayed at the reception side terminal(s) based on the display area information supplied from the reception side terminal(s), and displays a maximum display area with the calculated size on a screen of the transmission side terminal itself.
(Mode 4)
In the display screen sharing system, it is preferred that the transmission side terminal comprises a maximum display area frame movement detection unit that detects that a position of the maximum display area has been changed on a screen by a user operation, and notifies the reception side terminal(s) of the changed position of the maximum display area; and the reception side terminal(s) comprises a display area control unit that performs a window scroll so as to display the changed maximum display area notified from the transmission side terminal.
(Mode 5)
In the display screen sharing system, it is preferred that the maximum display area frame control unit of the transmission side terminal calculates an area that is most displayed at the reception side terminal(s), and displays the maximum display area at such a position that the maximum display area includes the area that is most displayed at the reception side terminal(s).
(Mode 6)
A display screen sharing method, according to the second aspect.
(Mode 7)
A non-transitory computer-readable recording medium, according to the third aspect.

Exemplary Embodiment

Next, an exemplary embodiment of the present disclosure will be described in detail with reference to the drawings.

Figure 1:
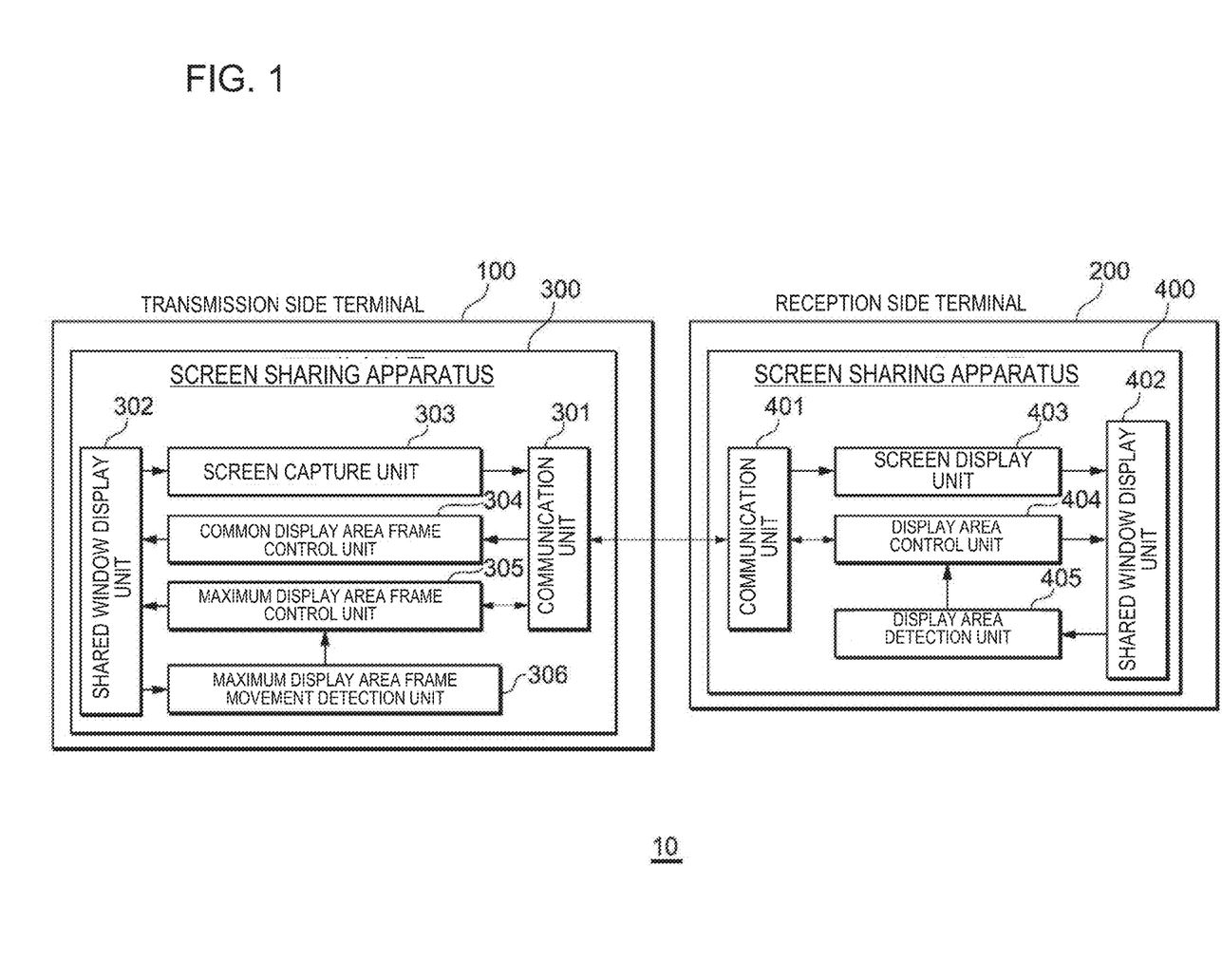
FIG. 1 is a block diagram showing a configuration of a display screen sharing system in accordance with an exemplary embodiment of the present disclosure.

FIG. 1 is a block diagram showing a configuration of a display screen sharing system 10 in accordance with the exemplary embodiment. As shown in FIG. 1, the display screen sharing system 10 includes a transmission side terminal 100 and a reception side terminal 200. The transmission side terminal 100 and the reception side terminal 200 are connected via a communication network. The transmission side terminal 100 has an operation right for a shared window of the transmission side terminal 100.

A special-purpose or general-purpose computer including a CPU, memories such as ROM, RAM, an external storage device storing various information, an input interface, an output interface, a communication interface, and a bus connecting them can be applied for the transmission side terminal 100 and the reception side terminal 200. The transmission side terminal 100 and the reception side terminal 200 may be configured by a single computer or a plurality of computers connected from each other via a communication line. A plurality of reception side terminals 200 may be included.

The transmission side terminal 100 and the reception side terminal 200 comprise a screen sharing apparatus 300 and a screen sharing apparatus 400, respectively. The screen sharing apparatus 300 of the transmission side terminal 100 comprises a communication unit 301, a shared window display unit 302, a screen capture unit 303, a common display area frame control unit 304, a maximum display area frame control unit 305, and a maximum display area frame movement detection unit 306.

Each of the communication unit 301, the shared window display unit 302, the screen capture unit 303, the common display area frame control unit 304, the maximum display area frame control unit 305, and the maximum display area frame movement detection unit 306 corresponds to a module of a function that is realized by executing a predetermined program stored in ROM etc. on a CPU of the transmission side terminal 100.

The screen sharing apparatus 400 of the reception side terminal 200 comprises a communication unit 401, a shared window display unit 402, a screen display unit 403, a display area control unit 404, and a display area detection unit 405. Each of the communication unit 401, the shared window display unit 402, the screen display unit 403, the display area control unit 404, and the display area detection unit 405 corresponds to a module of a function that is realized by executing a predetermined program stored in ROM etc. on a CPU of the reception side terminal 200.

A function of each unit of the transmission side terminal 100 will be described. The communication unit 301 has a function of transmitting and receiving screen data etc. between the communication unit 301 and the reception side terminal 200. The shared window display unit 302 has a function of displaying a shared window so as to enclose a screen that the transmission side terminal 100 wants to share with the reception side terminal 200.

The screen capture unit 303 has a function of capturing a screen on the shared window. The common display area frame control unit 304 determines a common display area that is displayed in common at all the reception side terminals 200, and displays the common display area on the shared window.

The maximum display area frame control unit 305 calculates a maximum display area based on display area information received from the reception side terminal 200, and displays a maximum display area frame on the shared window. The maximum display area frame movement detection unit 306 has a function which, if a movement of the maximum display area frame is detected, transmits the display area information after the movement to the reception side terminal 200.

A function of each unit of the reception side terminal 200 will be described. The communication unit 401 has a function of transmitting and receiving screen data etc. between the communication unit 401 and the transmission side terminal 100.

The shared window display unit 402 has a function of displaying common screen data transmitted from the transmission side terminal 100 on the shared window at the same size. Meanwhile, size of the shared window is variable, and the display area of the shared screen is freely changed using scrolling operated by a user of the reception side terminal 200.

The screen display unit 403 displays the common screen data on the shared window. The display area control unit 404 has an automatic scroll function in which a display area is changed based on display area information received from the transmission side terminal 100.

The display area detection unit 405 has a function which detects display area information (coordinates, size) indicating an area that a user can view across the shared screen displayed on the shared window, and transmits the display area information to the transmission side terminal 100.

Figure 2:
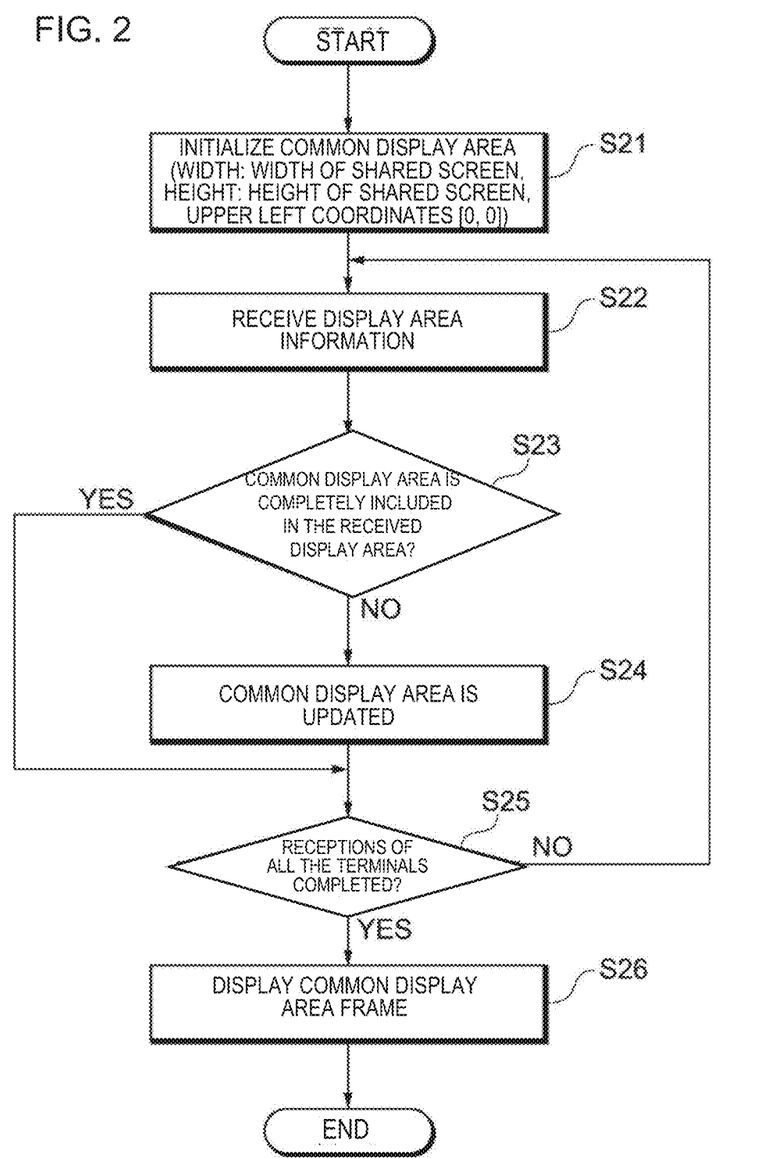
FIG. 2 is a flow chart of an operation of a transmission side terminal in accordance with the exemplary embodiment.
Figure 3:
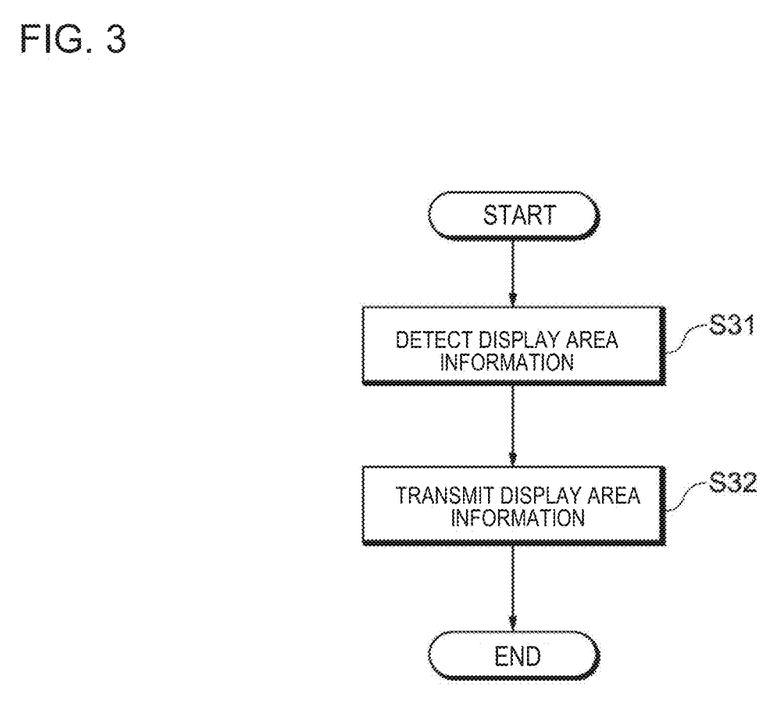
FIG. 3 is a flow chart of an operation of a reception side terminal(s) in accordance with the exemplary embodiment.
Figure 4:
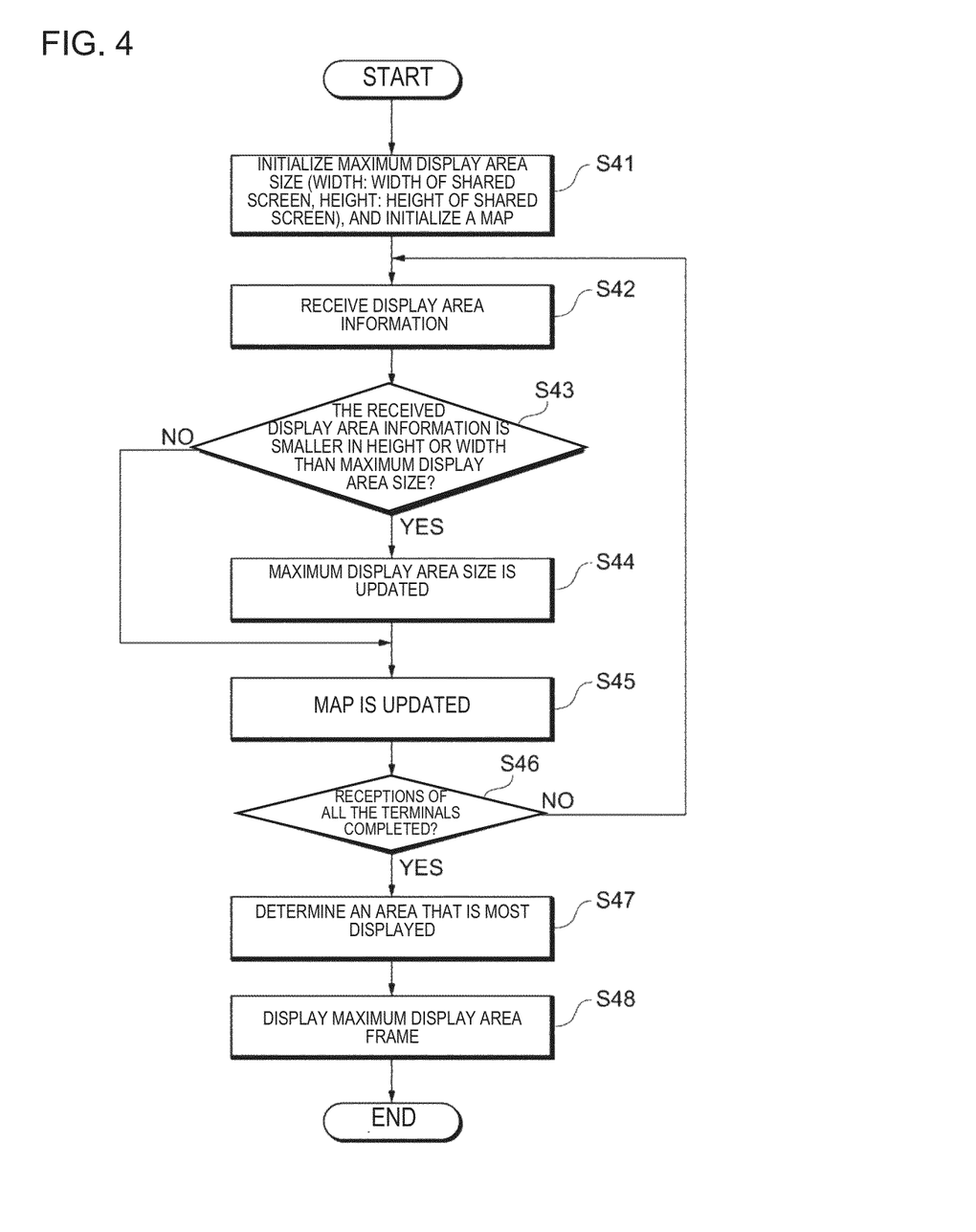
FIG. 4 is a flow chart of an operation of a transmission side terminal in accordance with the exemplary embodiment.
Figure 5:
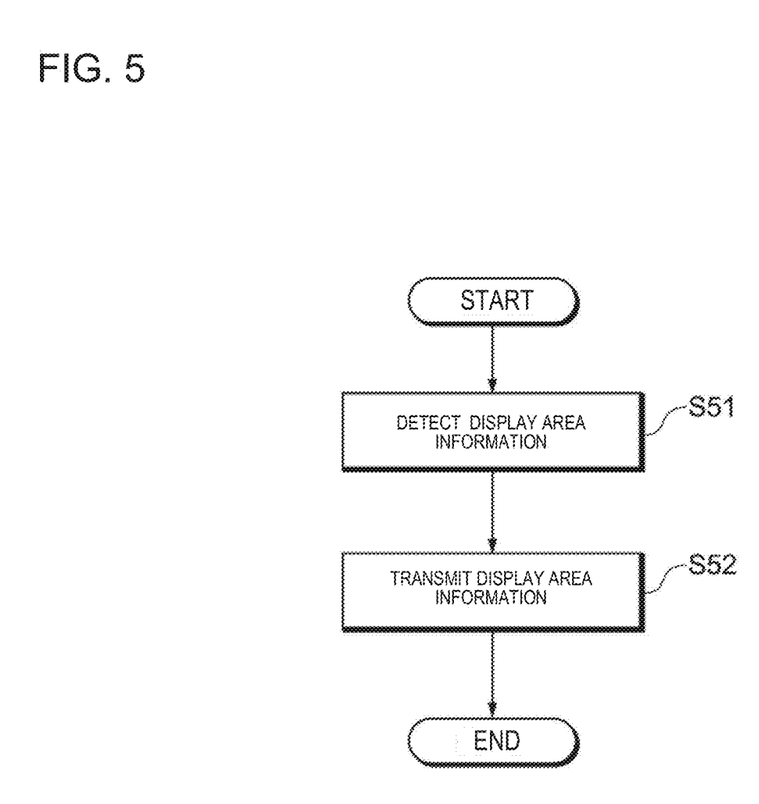
FIG. 5 is a flow chart of an operation of a reception side terminal(s) in accordance with the exemplary embodiment.

Next, an operation of the display screen sharing system 10 will be described with reference to FIGS. 2-10. FIGS. 2, 4 are flowcharts of an operation of the transmission side terminal 100, and FIGS. 3, 5 are flowcharts of an operation of the reception side terminal 200. FIGS. 6-10 are illustrations of examples of shared windows displayed at the transmission side terminal 100 and the reception side terminal 200. Meanwhile, in FIGS. 6-10, examples in which three reception side terminals 200 are included are illustrated, where the reception side terminals are denoted by "terminal 1", "terminal 2", and "terminal 3".

Figure 6:
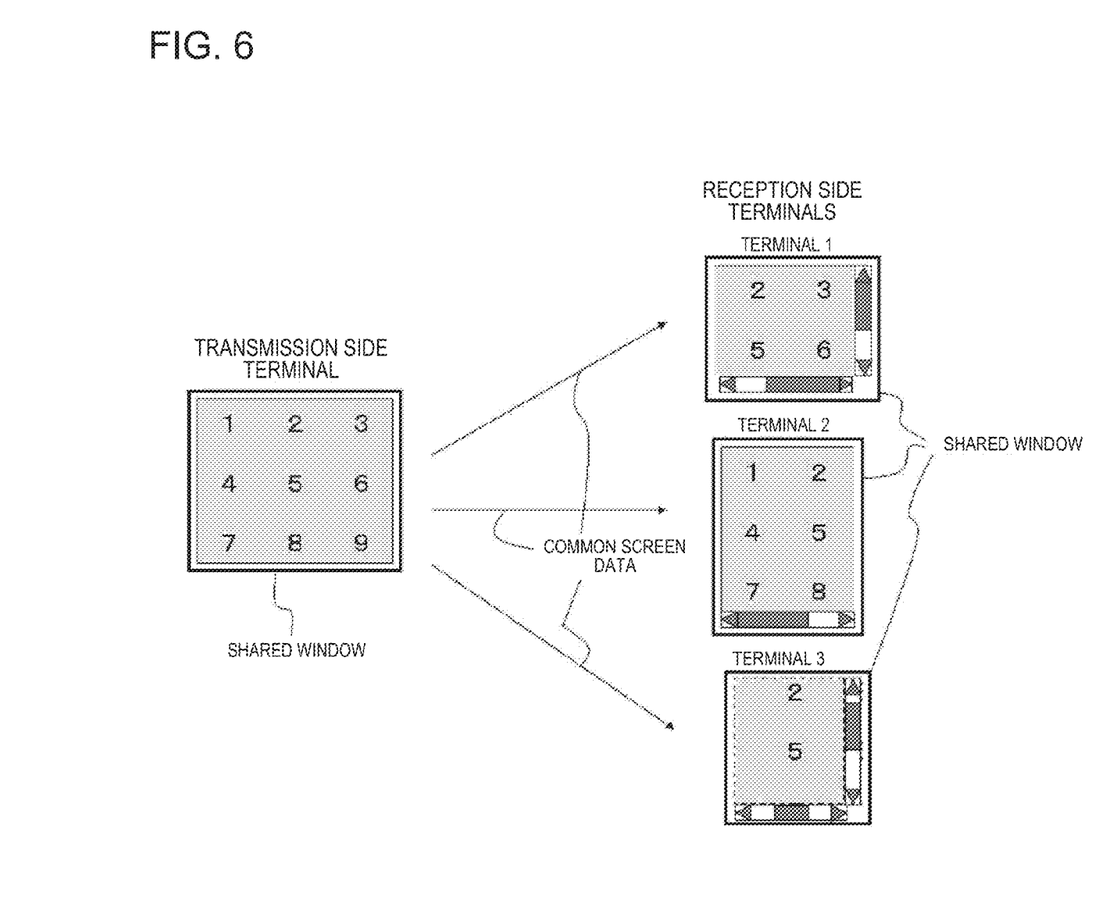
FIG. 6 is a figure showing an example of shared windows displayed on a transmission side terminal and reception side terminals in accordance with the exemplary embodiment.

FIG. 6 illustrates a state, in which size of shared window of the transmission side terminal 100 is different from that of the reception side terminal 200. In the transmission side terminal 100, the shared window display unit 302 sets a shared window so as to enclose a screen (rectangular area where numbers "1" to "9" are displayed; hereinafter referred to as a shared screen) that the transmission side terminal 100 wants to share with the reception side terminal 200.

Next, in the transmission side terminal 100, the screen capture unit 303 captures the shared screen on the shared window, and transmits the captured shared screen to the reception side terminal via a communication unit 301 and a network. In reception side terminal 200, the communication unit 401 receives the shared screen, and the screen display unit 403 displays the shared screen on the shared window displayed by the shared window display unit 402.

At this time, since the shared windows of the terminal 1 to 3 are different from that of the transmission side terminal 100, scroll bars are displayed. Further, since users of the reception side terminals 200 can operate the scroll bar freely, display areas of the reception side terminals 200 are different from each other. In an example of FIG. 6, terminals 1-3 display different areas respectively as follows: a terminal 1 displays "2", "3", "5", and "6"; a terminal 2 displays "1", "2", "4", "5", "7", and "8"; and a terminal 3 displays "2", and "5".

Figure 7:
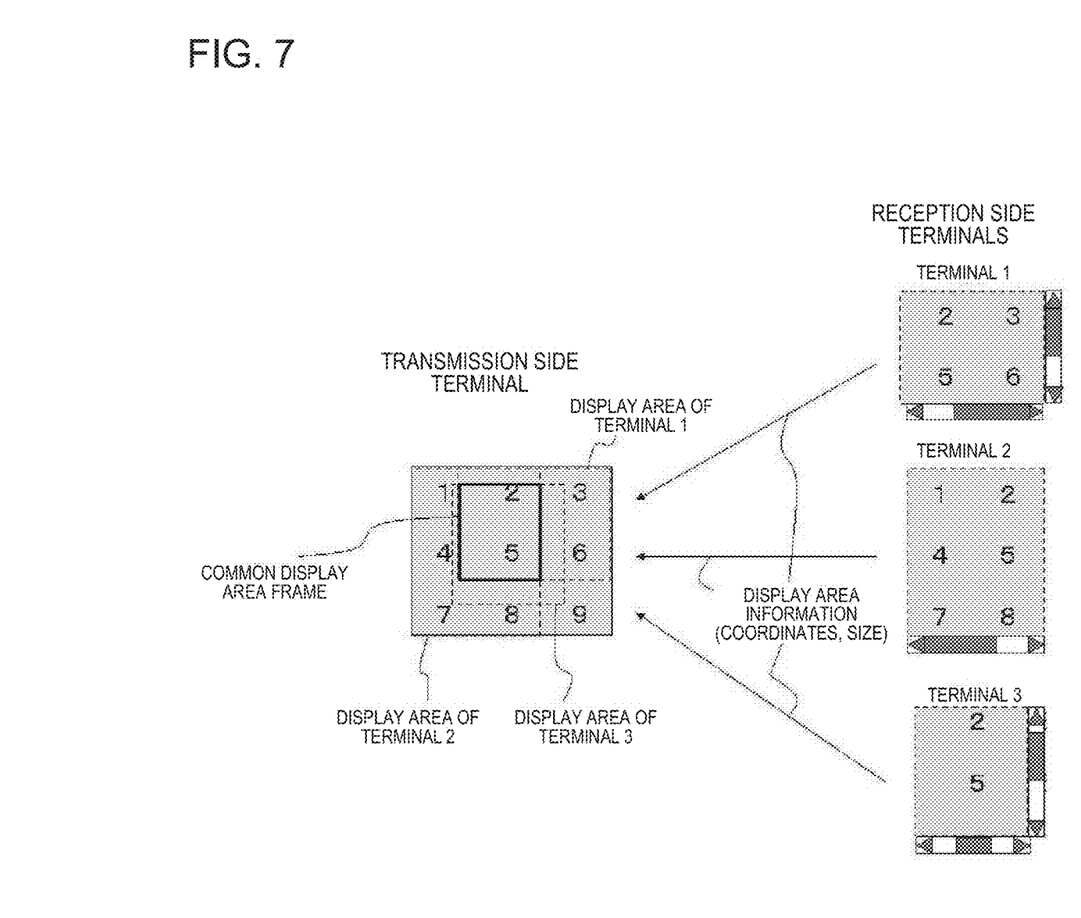
FIG. 7 is a figure showing an example of shared windows displayed on a transmission side terminal and reception side terminals in accordance with the exemplary embodiment.

Next, referring to FIGS. 2, 3, 7, a display processing of a common display area frame will be described. In each of the reception side terminals 200, the display area detection unit 405 detects display area information (coordinates, size) of a display area displayed on the shared window (FIG. 3; step S31), and transmits the display area information to the transmission side terminal 100 via a communication unit 401 (step S32).

The transmission side terminal 100 determines acquires display area information of the reception side terminals 200 periodically, and determines a common display area that is displayed in common by all the reception side terminals 200.

Processing of the transmission side terminal 100 will be described in detail with reference to FIG. 2. After the transmission side terminal 100 initializes the common display area information that is maintained (step S21), the transmission side terminal 100 receives display area information of one reception side terminal 200 (step S22). Next, the common display area frame control unit 304 judges whether or not the maintained common display area is completely included in the received display area (step S23). If the maintained common display area is completely included (YES), then go to step S25; and if receptions of display area information from all the reception side terminals 200 have been not completed, then return to step 22.

On the other hand, if the common display area is not completely included (step S23; NO), go to step S24, where the common display area is updated; and go to step S25. If receptions of display area information from all the reception side terminals 200 have been completed (step S25; YES), the common display area frame control unit 304 displays a frame that encloses the maintained common display area (common display area frame) on a screen of the transmission side terminal 100.

By an example shown in FIG. 7, the details will be explained. First, when display area information ("2", "3", "5", and "6") is received from the terminal 1, the common display area becomes an area which includes "2", "3", "5", and "6". Next, when display area information ("1", "2", "4", "5", "7", and "8") is received from the terminal 2, the common display area is updated to an area which includes "2", and "5". Lastly, when display area information ("2", "5") is received from the terminal 3, since the maintained common display area ("2", "5") is completely included in the display area of the terminal 3, the common display area is determined as an area which includes "2", "5". As the result, as shown in FIG. 7, a common display area frame that encloses "2", "5" is displayed on the screen of the transmission side terminal 100.

As mentioned above, a user of the transmission side terminal 100 can identify what area is displayed on a shared window(s) of the reception side terminal(s) 200 by indicating an area, which is displayed in common at three reception side terminals, with a frame, which makes it possible to make a presentation smoothly at a meeting etc.

Figure 8:
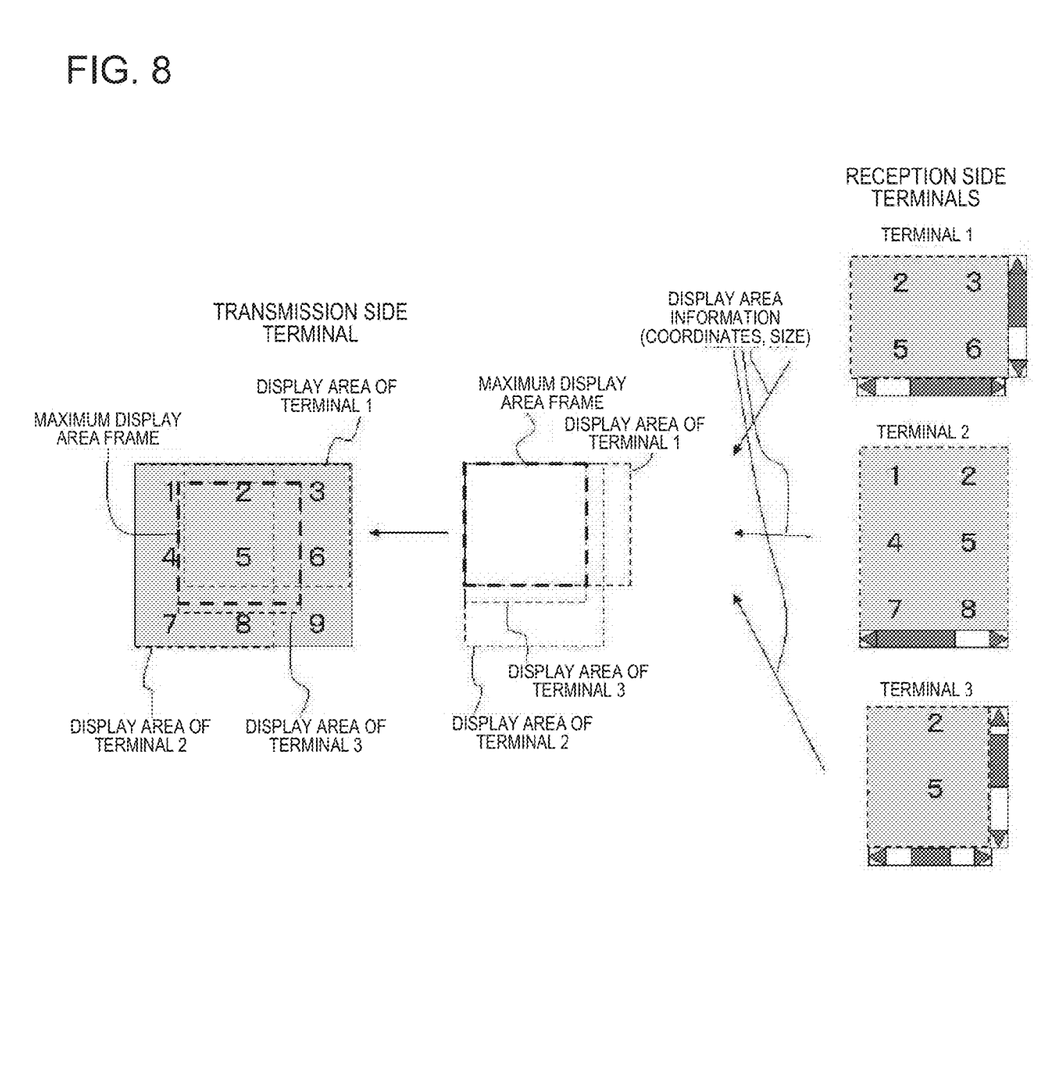
FIG. 8 is a figure showing an example of shared windows displayed on a transmission side terminal and reception side terminals in accordance with the exemplary embodiment.

Next, a display processing of a maximum display area frame will be described with reference to FIGS. 4, 5 and 8. In each of the reception side terminals 200, the display area detection unit 405 detects display area information (coordinates, size) of a display area displayed on a shared window (FIG. 5; step S51), and transmits the display area information to the transmission side terminal 100 (step S52).

The transmission side terminal 100 acquires display area information of the reception side terminals 200 periodically, calculates a minimum width and a minimum height among display area information displayed at all the reception side terminals 200, and sets the width and the height as size of the maximum display area frame.

Processing of the transmission side terminal 100 will be described in detail with reference to FIG. 4. In the transmission side terminal 100, after the maintained maximum display area size information is initialized (step S41), display area information of one of the reception side terminals 200 is received (step S42). Next, the maximum display area frame control unit 305 compares the received width and height of display area with the width and height of the maintained maximum display area size (step S43); if the received width or the received height is smaller (YES), go to step S44, where the maximum display area size is updated; and go to step S45. If the received width and height are larger than the width and height of the maximum display area size respectively (NO), go to step S45.

In step S45, a map is updated. The map is used in a post-process step S47 when an area that is most displayed at all the reception side terminals 200 is determined. It will be mentioned later how to make the map and how to determine an area that is most displayed.

Next, go to step S46, where if receptions of display area information from all the reception side terminals 200 have been not completed (NO), return to step S42. If receptions of display area information from all the reception side terminals 200 have been completed (YES), go to step S47. Next, the maximum display area frame control unit 305 determines an area that is most displayed at all the reception side terminals 200 (step S47), and displays a frame with the maximum display area size (maximum display area frame) at the determined position on a screen of the transmission side terminal 100 (step S48).

By an example of FIG. 8, the details will be explained. First, when display area information ("2", "3", "5", and "6") is received from the terminal 1, the width of the maximum display area size becomes 2, and the height of the maximum display area size becomes 2. Next, when display area information ("1", "2", "4", "5", "7", and "8") is received from the terminal 2, since the width and the height are larger than the maximum display area size, the width of the maximum display area size is maintained as 2, and the height of the maximum display area size is maintained as 2. Lastly, when display area information ("2", "5") is received from the terminal 3, since the width of the display area of the terminal 3 is 1, the width of the maximum display area size is updated to 1, and the height of the maximum display area size is updated to 2. Further, the maximum display area frame control unit 305 determines an area that is most displayed at all the reception side terminals 200.

Figure 9:
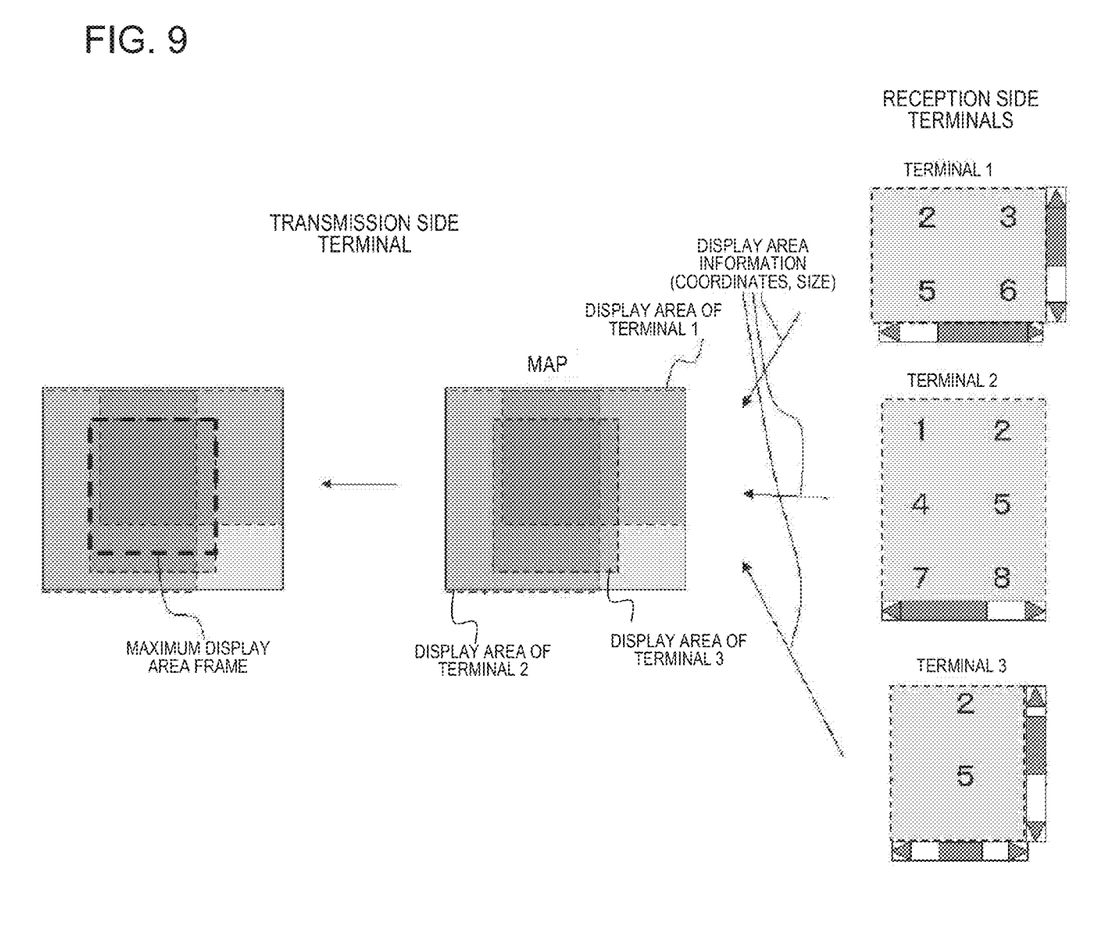
FIG. 9 is a figure showing an example of shared windows displayed on a transmission side terminal and reception side terminals in accordance with the exemplary embodiment.

A method of calculating an area that is most displayed at all the reception side terminals 200 will be described with reference to FIG. 9. First, a display area received from one reception side terminal 200 is overlapped to a screen of the transmission side terminal 100; one point is added to each of the overlapped coordinates. The above processing is repeated for each of the reception side terminals 200 in step S45 of FIG. 4. When display areas of all the reception side terminals 200 have been overlapped, if number of reception side terminal 200 displayed at certain coordinates is 1, the point of the coordinates is 1; if number of reception side terminal 200 displayed at certain coordinates is 2, the point of the coordinates is 2. As mentioned above, a map showing high point areas and low point areas can be generated. An area, in which the total of the points inside the maximum display area frame gets the highest value when the maximum display area frame is disposed on the generated map, is set as an area that is most displayed.

Since maximum display area size is less than or equal to a shared window size of each of the reception side terminals 200, the maximum display area size is a size at which any of the reception side terminals 200 can display by adjusting coordinates of the display area using scroll. The maximum display area size is also the maximum size that can be displayed as a common display area at the same time.

Meanwhile, a display position of the maximum display area frame may be an area that is most displayed at all the reception side terminals 200 as mentioned above, or may be certain predetermined coordinates such as an upper left corner.

Figure 10:
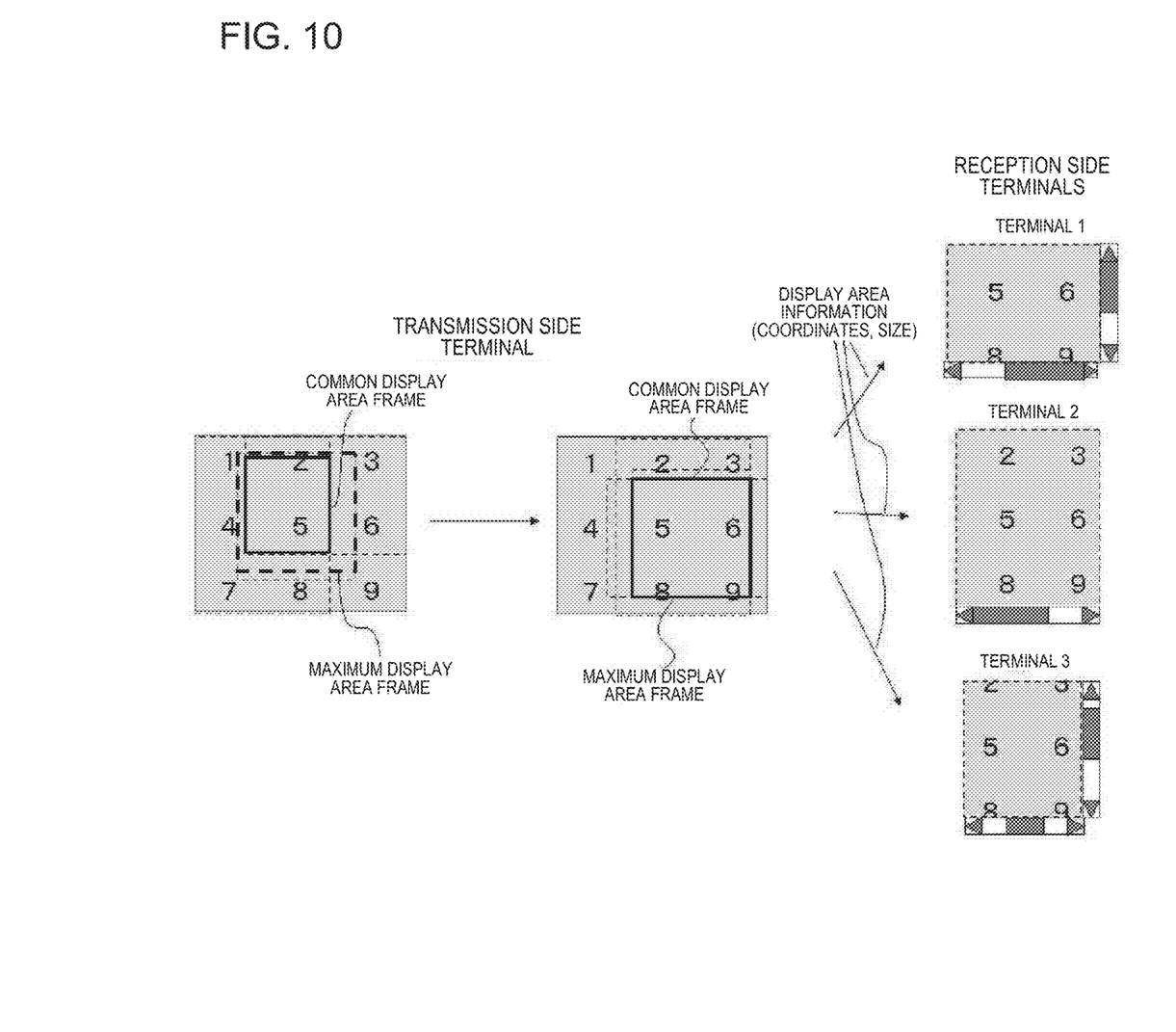
FIG. 10 is a figure showing an example of shared windows displayed on a transmission side terminal and reception side terminals in accordance with the exemplary embodiment.

Next, in the transmission side terminal 100, an operation of moving the maximum display area frame will be described with reference to FIG. 10. If a user of the transmission side terminal 100 moves the maximum display area frame (drags the frame), the maximum display area frame movement detection unit 306 detects the movement, and area information of the moved destination is transmitted to the display area control unit(s) 404 of the reception side terminal(s) 200 via the communication unit 301.

The display area control unit(s) 404 of the reception side terminal(s) 200 executes an automatic scroll of the shared window so that the received area can be displayed. Since the maximum display area frame size is a size at which all the reception side terminals 200 can display, all the reception side terminals 200 can surely display the maximum display area by scrolling. The scroll may be a minimum scroll needed to display an area inside the maximum display area frame indicated by the transmission side terminal 100, or may be a scroll in which the upper left corner of the display area matches the upper left corner of the indicated maximum display area.

As mentioned above, by displaying the maximum display area frame at the transmission side terminal 100, a user of the transmission side terminal 100 can identify the maximum size that can be displayed as a common display area at all the reception side terminals 200. Further, since if a position of the maximum display area frame is indicated at the transmission side terminal 100, an automatic scroll is executed so that the indicated position is displayed at each of the reception side terminals 200, an area that a user of the transmission side terminal 100 wants to display as a common display area is displayed automatically at each of the reception side terminals 200.

As mentioned above, according to the exemplary embodiment, the display area detection unit 405 notifies the transmission side terminal 100 of display area information of the reception side terminal(s) 200, and the common display area frame control unit 304 displays a common display area frame on a screen of the transmission side terminal 100, which makes it possible that a user of transmission side terminal 100 can confirm contents displayed on a shared window of the reception side terminal(s) 200. In particular, in a case where there are a plurality of reception side terminals 200, since an intersection (i.e. commonly shared portion) that is displayed at all the reception side terminals 200 is displayed. Thus, even though there are many reception side terminals, a user of the transmission side terminal 100 can easily know the contents that users of all the reception side terminals 200 are viewing.

Since the maximum display area control unit 305 displays a maximum display area frame on a screen of the transmission side terminal 100, when a user of the transmission side terminal 100 controls a display area of the reception side terminal(s) 200 forcibly, the user of the transmission side terminal 100 can confirm displayable size of the reception side terminal(s) 200.

If a user of the transmission side terminal 100 indicates a display area by moving a maximum display area frame, the maximum display area frame movement detection unit 306 detects the indication to notify the reception side terminal 200 of the indicated area. Since in the reception side terminal 200, the display area control unit 404 executes an automatic scroll to display the indicated area, a user of the transmission side terminal 100 can easily control a display area of the reception side terminal 200, which makes it possible to attempt to maximize the common display area.

If the maximum display area frame is disposed at an area that is most displayed at the reception side terminal(s) 200, when the transmission side terminal 100 controls a display area(s) of the reception side terminal(s) 200, it is unnecessary to move the display position to an extent that is uselessly large.

Meanwhile, a variation of the present exemplary embodiment will be described below. In the transmission side terminal 100, a common display area may be fixed. At this time, in the reception side terminal(s) 200, a scroll range may be limited so that the indicated common display area is displayed at least. From the above, in the reception side terminal 200 that has a large shared window, it is possible to maintain scroll flexibility while always displaying the common display area.

In the transmission side terminal 100, the common display area frame and the maximum display area frame may be not always displayed, and may be displayed by an operation of button click etc.

A threshold value is provided to size of display area of the reception side terminal 200, when a common display area frame and maximum display area frame are determined, display area information of a reception side terminal 200 whose display area is smaller than the threshold value may be ignored. From the above, it is possible to execute processing without taking into account information of a reception side terminal 200 whose display area is extremely small.

When the common display area frame and the maximum display area frame are determined, display area information from all the reception side terminals 200 may be sorted in descending order of display area size to use information from a preset number of the sorted reception side terminals. From the above, when display areas of a small number of the reception side terminals 200 are small, their influence can be removed.

Instead of showing the common display area using a frame, a translucent window may be overlapped and displayed at the outside portion of the common display area.

All user participants may confirm the common display area by displaying the common display area at the reception side terminal 200 as well.

The method of moving the maximum display area frame is not limited to dragging a frame but may be indicating coordinates of a moving destination by clicking.

A function of transferring an operation right from the transmission side terminal 100 to the reception side terminal 200 is generally implemented in a screen sharing function, where a mouse operation or a keyboard operation for a shared window can be executed at the reception side terminal 200 that has acquired the operation right. In this case, an effect similar to that in the present exemplary embodiment can be obtained by displaying the common display area frame and the maximum display area frame on a window of the reception side terminal 200 that has acquired the operation right. If a screen of the reception side terminal 200 that has acquired the operation right is scrolled, a common display area of the transmission side terminal 100 is moved, and an automatic scroll is executed also at the other reception side terminals 200.

The present disclosure is suitable for a system that uses a screen sharing function at a plurality of terminals, for example, a web meeting system.

Descriptions have been given above of various exemplary embodiments of the present invention, but the present invention is not limited to the abovementioned modes or exemplary embodiments, and further modifications, substitutions and adjustments may be added within a scope that does not depart from fundamental technical concepts of the present disclosure. Furthermore, the respective exemplary embodiments may be implemented in combination, as appropriate.

It is to be noted that each disclosure of the abovementioned Patent Literatures is incorporated herein by reference thereto. Modifications and adjustments of the exemplary embodiments are possible within the scope of the overall disclosure (including the claims) of the present disclosure and based on the basic technical concept of the present disclosure. Various combinations and selections of various disclosed elements (including each element of each claim, each element of each mode or exemplary embodiment, each element of each drawing, etc.) are possible within the scope of the claims of the present disclosure. That is, the present disclosure of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

What is claimed is:

1. A display screen sharing system, that shares a common screen among a plurality of terminals, the system comprising:
    a transmission side terminal that has an operation right for said common screen; and
    a reception side terminal that does not have the operation right for said common screen, wherein
    said reception side terminal comprises a display area detection unit that acquires display area information indicating an area of said common screen displayed at the reception side terminal itself, and supplies said display area information to said transmission side terminal;
    said transmission side terminal comprises a common display area frame control unit that determines a common display area based on said display area information supplied from said reception side terminal, and displays said common display area on a screen at the transmission side terminal itself.

2. The display screen sharing system according to claim 1 comprising a plurality of said reception side terminals, wherein
    said common display area frame control unit of said transmission side terminal acquires said display area information from each of said reception side terminals, and displays an area that is displayed in common at all the reception side terminals as said common display area.

3. The display screen sharing system according to claim 1, wherein
    said transmission side terminal comprises a maximum display area frame control unit that calculates a maximum size of a display area that can be displayed at said reception side terminal(s) based on said display area information supplied from said reception side terminal(s), and displays a maximum display area with the calculated size on a screen of the transmission side terminal itself.

4. The display screen sharing system according to claim 2, wherein
    said transmission side terminal comprises a maximum display area frame control unit that calculates a maximum size of a display area that can be displayed at said reception side terminal(s) based on said display area information supplied from said reception side terminal(s), and displays a maximum display area with the calculated size on a screen of the transmission side terminal itself.

5. The display screen sharing system according to claim 3, wherein
said transmission side terminal comprises a maximum display area frame movement detection unit that detects that a position of said maximum display area has been changed on a screen by a user operation, and notifies said reception side terminal(s) of the changed position of said maximum display area; and
said reception side terminal(s) comprises a display area control unit that performs a window scroll so as to display the changed maximum display area notified from said transmission side terminal.

6. The display screen sharing system according to claim 3, wherein
said maximum display area frame control unit of said transmission side terminal calculates an area that is most displayed at said reception side terminal(s), and displays said maximum display area at such a position that said maximum display area includes the area that is most displayed at said reception side terminal(s).

7. The display screen sharing system according to claim 5, wherein
said maximum display area frame control unit of said transmission side terminal calculates an area that is most displayed at said reception side terminal(s), and displays said maximum display area at such a position that said maximum display area includes the area that is most displayed at said reception side terminal(s).

8. A display screen sharing method, that shares a common screen among a plurality of terminals, the method comprising:
by a reception side terminal that does not have an operation right for said common screen, acquiring display area information that indicates an area of said common screen displayed at the reception side terminal itself;
by said reception side terminal, supplying said display area information to a transmission side terminal that has an operation right for said common screen;
by said transmission side terminal, determining a common display area based on said display area information supplied from said reception side terminal; and
by said transmission side terminal, displaying said common display area on a screen of the transmission side terminal itself.

9. A non-transitory computer-readable recording medium that stores a program, said program is adapted for operating a computer as a transmission side terminal that has an operation right for said common screen in a display screen sharing system sharing a common screen among a plurality of terminals, wherein
said program operates said computer as a common display area frame control unit that determines a common display area based on display area information which is supplied from a reception side terminal that does not have an operation right for said common screen; and that indicates an area of said common screen displayed at said reception side terminal, and displays said common display area on a screen of the transmission side terminal itself.

* * * * *